United States Patent [19]

Machado et al.

[11] Patent Number: 4,960,560
[45] Date of Patent: Oct. 2, 1990

[54] SPENT FUEL STORAGE RACK FOR BWR FUEL ASSEMBLIES

[75] Inventors: Octavio Machado, Pensacola, Fla.; Clifford W. Henry, Metairie, La.; Ray L. Congleton, Cantonment; William M. Flynn, Pensacola, both of Fla.

[73] Assignee: Westinghouse Electric Corp., Pittsburgh, Pa.

[21] Appl. No.: 449,324

[22] Filed: Dec. 11, 1989

Related U.S. Application Data

[60] Division of Ser. No. 728,141, Apr. 26, 1985, abandoned, and a continuation of Ser. No. 147,822, Jan. 25, 1988, abandoned, and Parent of continuation of Ser. No. 149,982, Dec. 29, 1988, now U.S. Pat. No. 4,900,505.

[51] Int. Cl.⁵ .......................................... G21C 19/40
[52] U.S. Cl. .................................. 376/272; 376/260; 376/233
[58] Field of Search ............... 376/272, 233, 260, 261, 376/268

[56] References Cited

U.S. PATENT DOCUMENTS

| | | | |
|---|---|---|---|
| 3,859,533 | 1/1975 | Suvanto | 376/272 |
| 4,034,227 | 7/1977 | Soot | 376/272 |
| 4,143,276 | 3/1979 | Mollon | 376/272 |
| 4,243,889 | 1/1981 | Weber | 376/272 |
| 4,248,668 | 2/1981 | Dixon et al. | 376/272 |
| 4,305,787 | 12/1981 | Rivacoba | 376/272 |
| 4,319,960 | 3/1982 | Larson et al. | 376/272 |
| 4,342,620 | 8/1982 | Vickrey | 376/272 |
| 4,356,062 | 10/1982 | Bosshard | 376/272 |
| 4,366,115 | 12/1982 | Schlumpf | 376/272 |
| 4,746,487 | 5/1988 | Wachter | 376/272 |
| 4,820,472 | 4/1989 | Machado et al. | 376/272 |

FOREIGN PATENT DOCUMENTS

| | | | |
|---|---|---|---|
| 0071364 | 2/1983 | European Pat. Off. | 376/272 |
| 2730850 | 1/1979 | Fed. Rep. of Germany | 376/272 |
| 2742736 | 4/1979 | Fed. Rep. of Germany | 376/272 |

*Primary Examiner*—Harvey E. Behrend
*Attorney, Agent, or Firm*—H. Diamond

[57] ABSTRACT

A spent fuel rack for storing fresh fuel assemblies, or spent fuel assemblies removed from a nuclear reactor, which includes a base plate having multiple cells of modular construction welded at their bottom ends to the plate. The cells are formed of L-shaped sections having walls which support neutron absorbing material, and the walls of one cell are common to the adjacent cells. The base plate includes openings primarily for receiving the bottom nozzle of a fuel assembly, but they further serve as access openings for apparatus used for leveling the base plate and for lifting and transferring the base plate with or without cells thereon, to a different area.

3 Claims, 6 Drawing Sheets

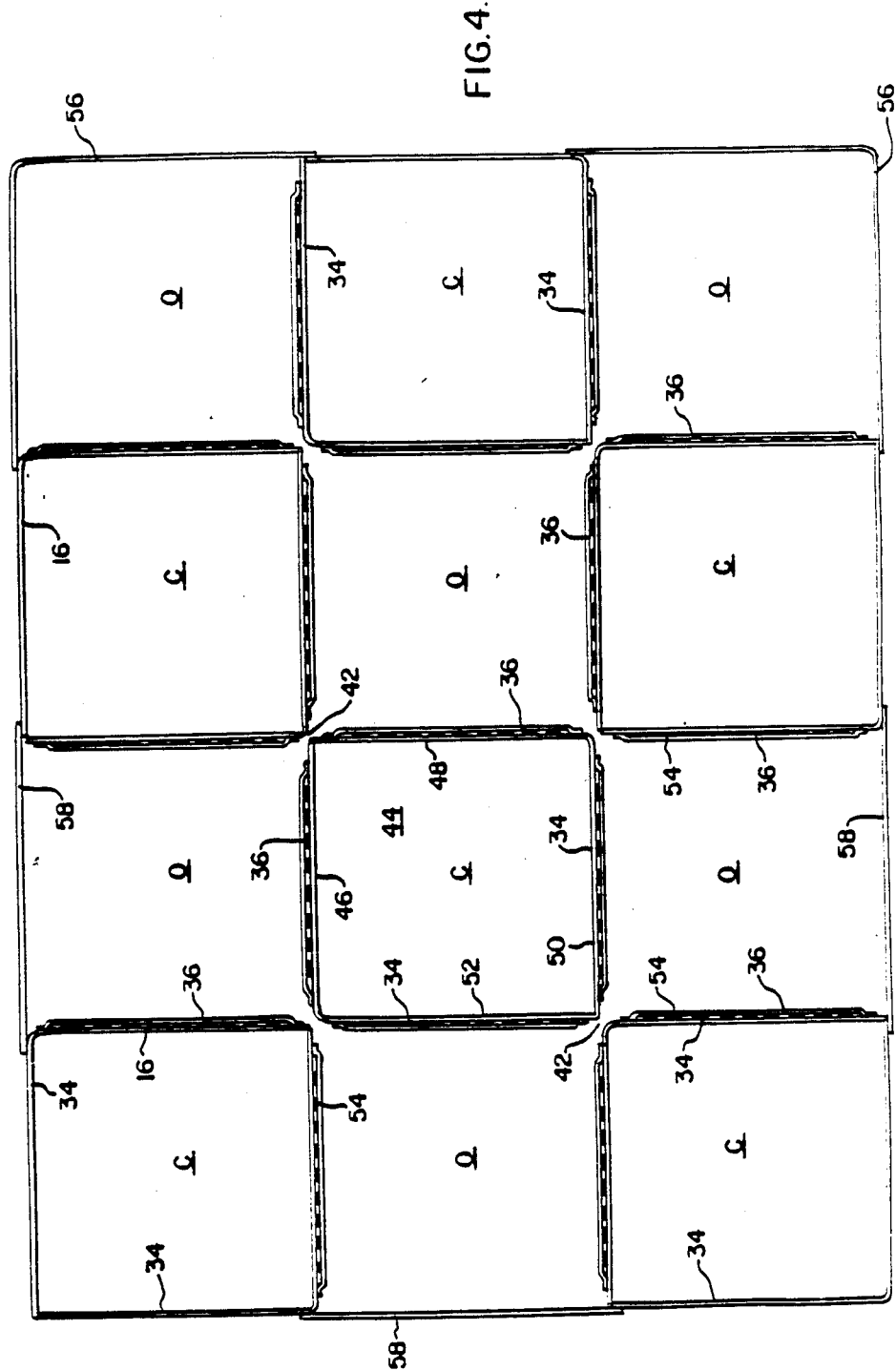

SPENT FUEL STORAGE RACK FOR BWR FUEL ASSEMBLIES

This application is a continuation of application Ser. No. 07/147,822 filed Jan. 25, 1988, now abandoned, and the parent of continuation Ser. No. 07/149,982 filed Dec. 29, 1988, now U.S. Pat. No. 4,900,505, and is a division of application Ser. No. 06/728,141 filed Apr. 26, 1985, now abandoned.

CROSS-REFERENCE TO RELATED APPLICATIONS

This application is closely related to the disclosure in application Ser. No. 282,991 (W.E. 49,099) filed July 14, 1981, now U.S. Pat. No. 4,820,472 granted Apr. 11, 1989, assigned to the assignee by the present invention.

BACKGROUND OF THE INVENTION

The invention described herein relates to spent fuel storage racks and more particularly to an improved design of racks particularly adapted for storage of fuel assemblies of the type used in boiling water reactors.

The delays in undertaking the reprocessing of reactor spent fuel in the United States has required utilities to better utilize the spent fuel storage space at a reactor site in a way to permit the storage of larger quantities of fuel in the same given area. The delays also have provided the economic incentive to increase the storage capacity and thus better control the handling and disposition of spent fuel and costs associated therewith. Initially, plant designers typically included at the reactor site, a spent fuel pool sized to receive a number of spent fuel assemblies less than the total amount expected to be removed from the reactor during its lifetime. The fuel assemblies were located on centers or at a pitch such that the space between assemblies together with the water surrounding each fuel assembly was sufficient to maintain the fuel in a non-critical condition. At this spacing, subcriticality was maintained by utilizing only water as a moderator. As the need for compact storage increased, the first stage of capacity expansion included the use of stainless steel cells for containing each fuel assembly thus permitting reduced spacing between fuel assemblies. This reduction increased the storage capacity by simply changing the design of storage racks without increasing the size of the storage pool. As decisions concerning reprocessing continued to be delayed, greater compaction of fuel assemblies into the allotted pool space was accomplished by applying neutron absorbing materials to the walls of the stainless steel containers or cells which were made to a size to just accept a fuel assembly. This design permitted cells to be spaced on a pitch even less than previous rack designs thus increasing the storage capacity to the extent where the storage pool could accommodate about 10 years of spent fuel.

To provide stability and support to prior spent fuel racks, the spent fuel cells were laterally spaced from each other by structural members extending in X and Y directions to thus provide cell support as disclosed in Machado U.S. Pat. No. 4,820,472. The egg crate arrangement of cells thus formed allows one fuel assembly to be located in each cell designed to specific tolerances. However, the structural members still utilize space which otherwise could be used more efficiently for fuel assembly storage purposes. Also, fuel racks of the foregoing design contain substantial labor and material content which is reflected in greater manufacturing costs.

SUMMARY OF THE INVENTION

The above disadvantages of the prior art are overcome by this invention by providing a spent fuel rack module which includes a checkerboard array of cells of a size sufficient to accept the fuel assembly. In a preferred embodiment of the invention, the cells are formed of L-shaped sections welded along their longitudinal edges to provide a square-like opening for the fuel assembly. Neutron absorbing material on the walls of the L-shaped sections are chosen such that the nuclear absorbing material for one cell also serves as a wall for capturing neutrons from the next adjacent cell thus eliminating the need to construct a single cell for each fuel assembly. Arrangements are provided for lifting the complete modular structure after the cells are constructed and placing this structure on a base support plate. Provision also is made for leveling the base plate and modular structure supported thereon after it is placed in a spent fuel pool at a reactor site.

BRIEF DESCRIPTION OF THE DRAWINGS

While the foregoing discussion identifies problems presently existing in the prior art together with a general description of how they may be overcome, it is believed that this invention will be better understood with the aid of the following disclosure of the preferred embodiment of this invention with reference to the accompanying drawings, wherein:

FIG. 4 is a plan view of a portion of the modular structure shown in FIGS. 1 and 2 illustrating how the cells are formed and positioned prior to being structurally interconnected to arrive at the modular structure;

DESCRIPTION OF THE PREFERRED EMBODIMENT

Figure 1:
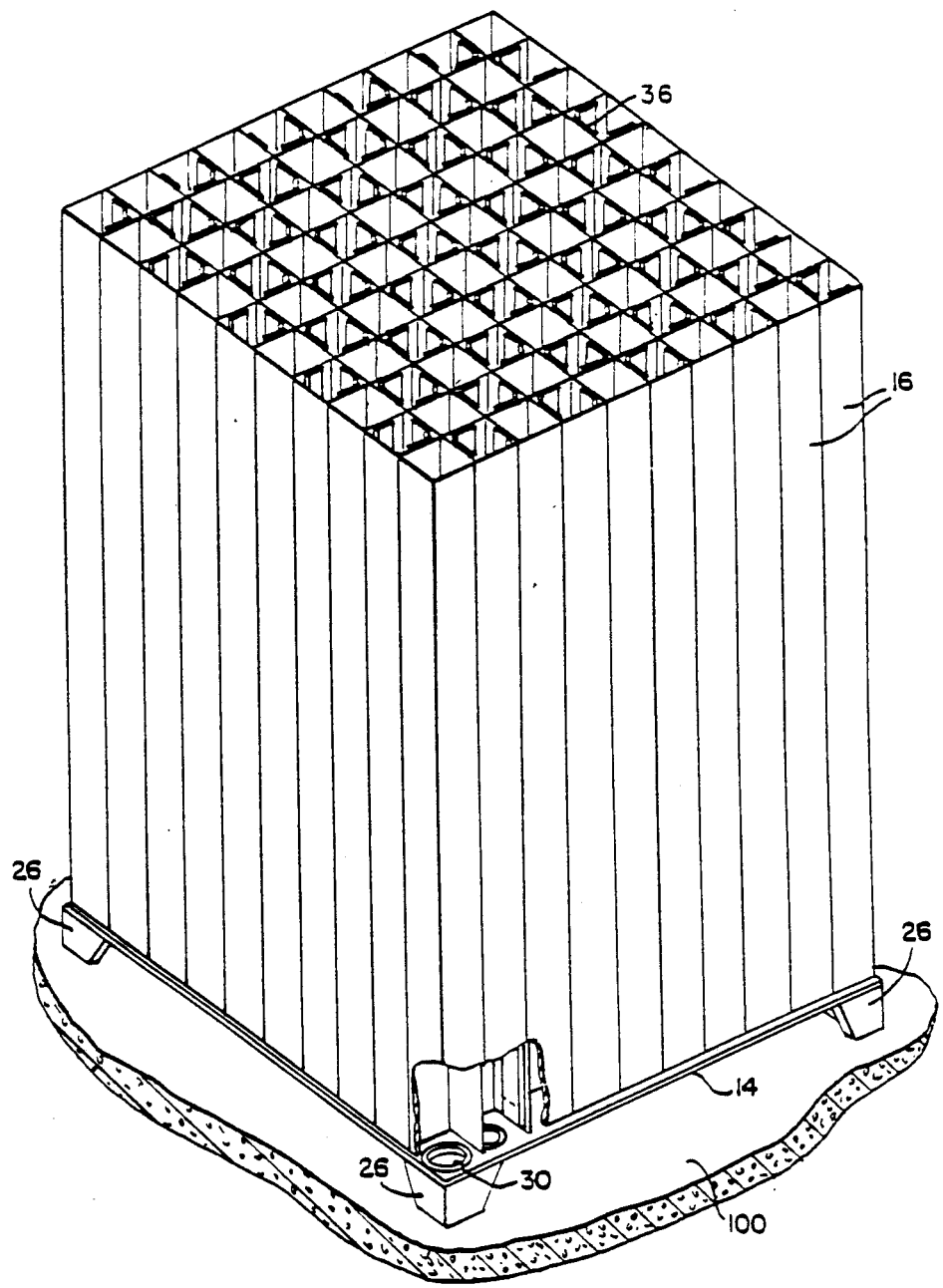
FIG. 1 is view in isometric of a modular spent fuel rack of this invention.
Figure 3:
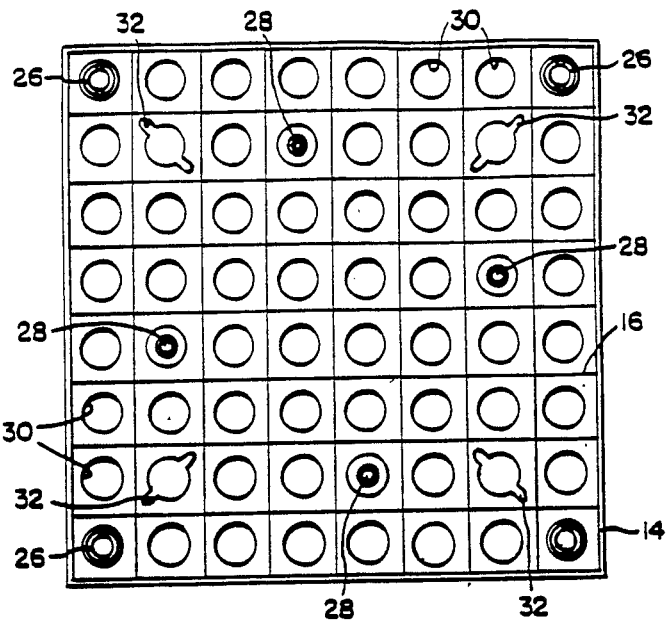
FIG. 3 is a plan view of the spent fuel rack illustrated in FIGS. 1 and 2.
Figure 2:
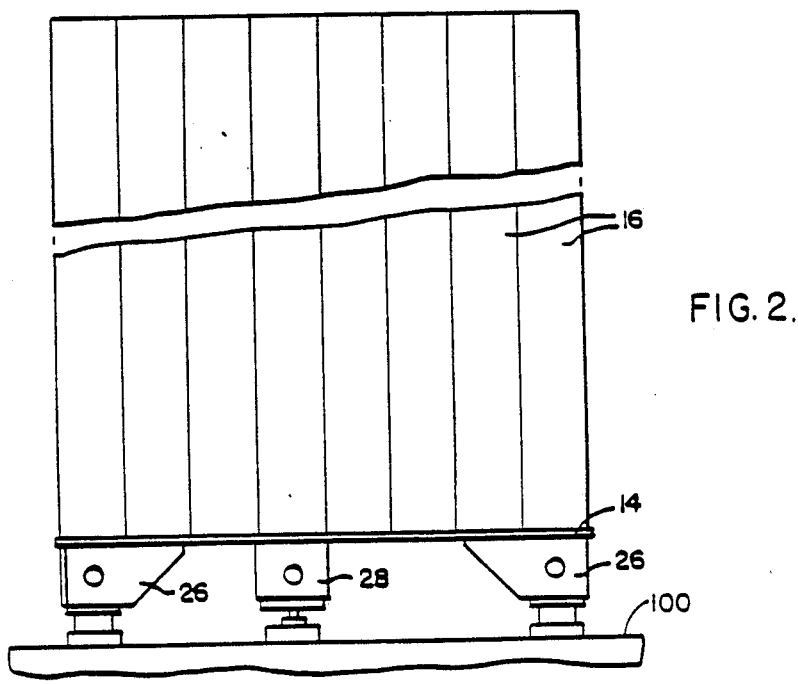
FIG. 2 is a front view in elevation of the spent fuel rack of FIG. 1.

Referring now to the drawings wherein like reference characters designate like or corresponding parts throughout the several views, there is shown in FIGS. 1-3 a fuel rack of modular design particularly adapted to receive fuel assemblies of the type used in boiling water reactors. The module includes a 0.50 inch thick base plate 14 designed to support multiple stainless steel containers or cells 16 each designed to hold a fuel assembly. Stability and rigidity is imparted to the modular unit by a base assembly and welds at the corners of each cell connecting all cells in a unitary structure. Adjustable leveling pads 26 located at the corners of the module and intermediate leveling pads 28 (FIGS. 2,3) located at appropriate points beneath the base plate assures desired rigidity. Squareness and verticality in the module are also assured by leveling the base plate to a horizontal position.

Figure 7:
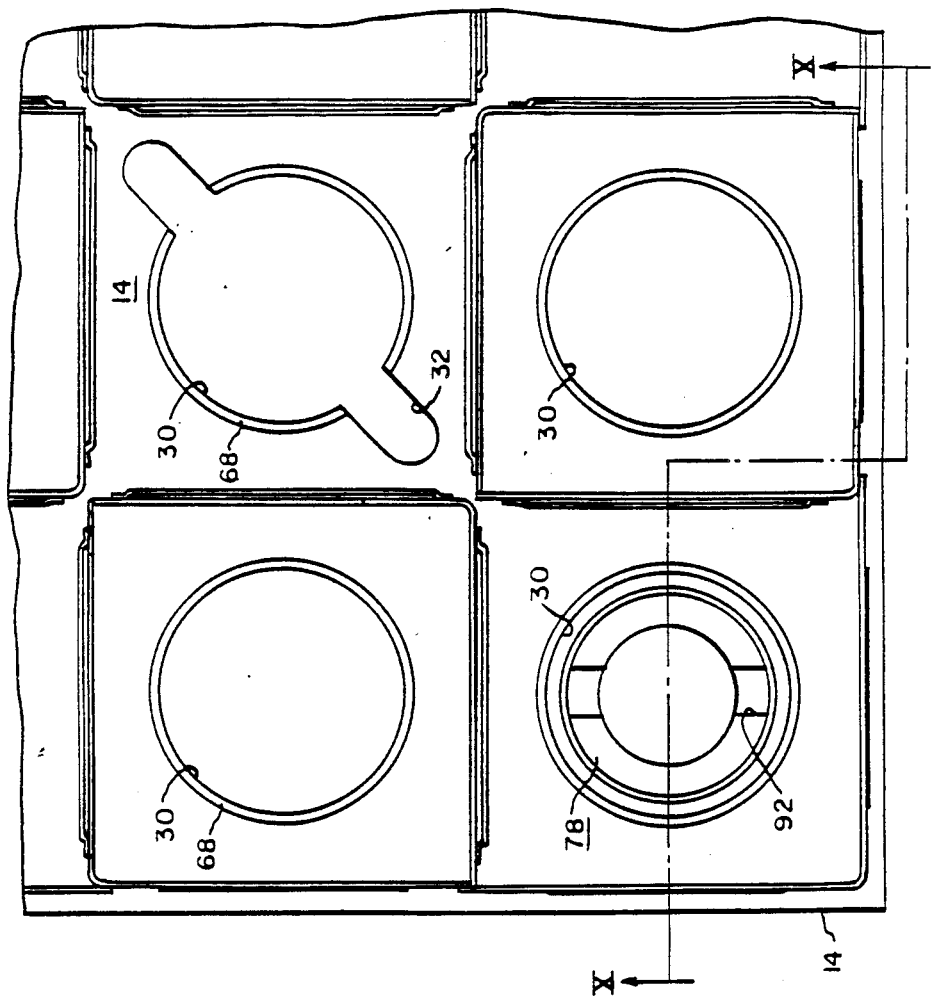
FIG. 7 is a plan view of the upper right-hand corner as viewed in FIG. 3 of the module shown in FIG. 3.
Figure 10:
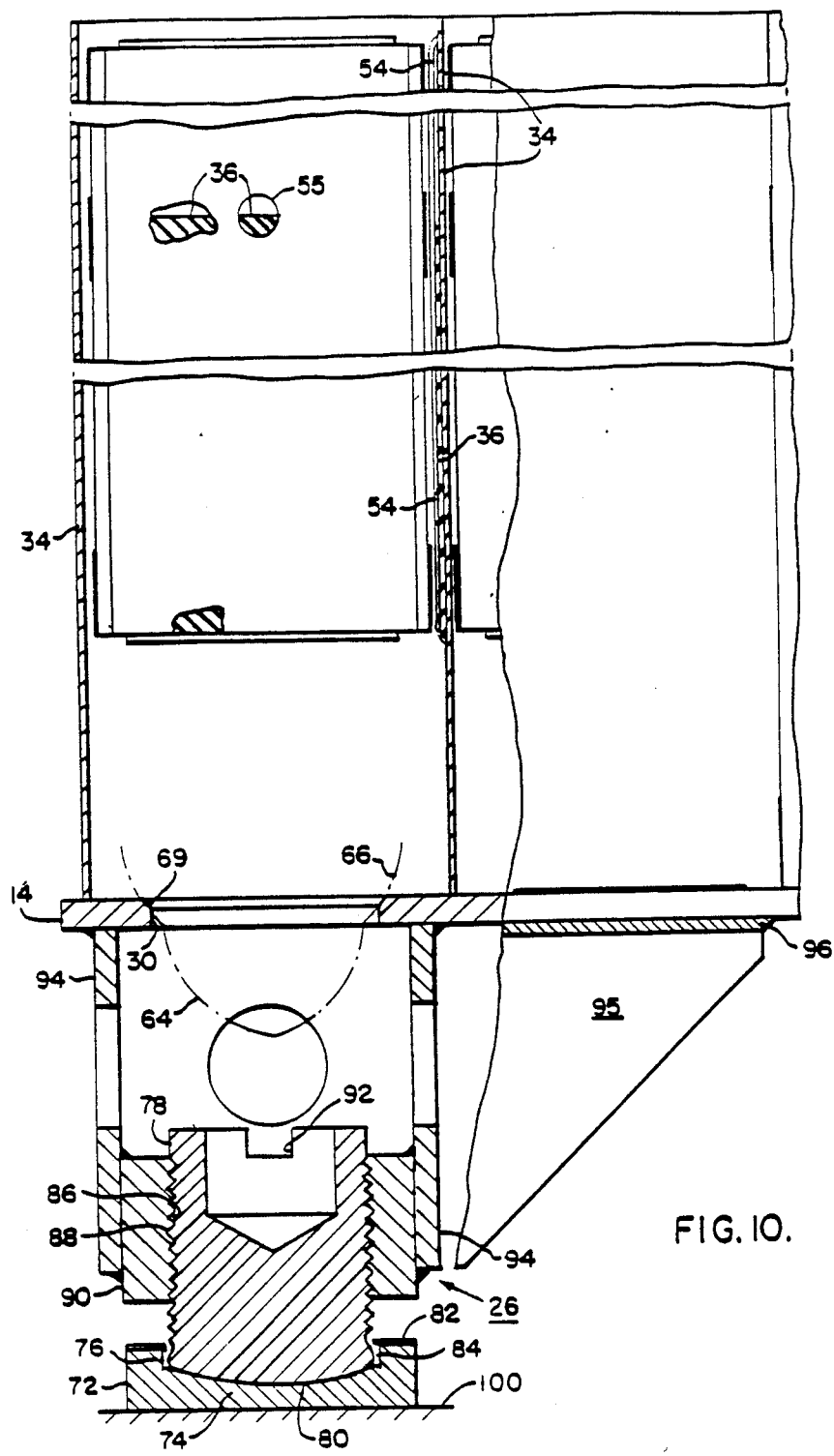
FIG. 10 is a view in section taken along lines X—X of FIG. 7 illustrating the arrangement used for leveling the base plate and cells mounted thereon.

As more clearly shown in FIGS. 3, 7 and 10, the base plate 14 includes multiple openings 30 of a design and size compatible with the configuration of the bottom nozzle of a fuel assembly adapted to be placed in each cell. In addition to receiving and supporting the bottom end of a fuel assembly, openings 30 provide a natural circulation flow path upwardly to assure proper cooling of the stored fuel assemblies by water or other coolant medium. Openings 30 further provide access to the leveling pads 26 while the openings in the central part of plate 14 provide access to the interior leveling pads 28. As more fully described hereafter, other openings have cut-away sections 32 which are particularly designed to receive a lifting tool for lifting and transferring the plate and/or the module to different locations.

Figure 5:
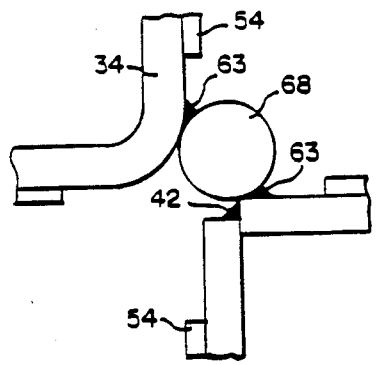
FIG. 5 is a detailed view of the connecting arrangement used for joining two adjacent cells where the gap between cells is of optimum size.
Figure 6:
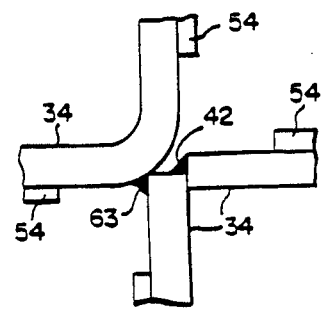
FIG. 6 is a view similar to FIG. 5 but showing how the adjacent cells are welded together where the distance between the cells is substantially smaller than the optimum size.

As illustrated in FIGS. 4-6, the spent fuel rack module is substantially different from prior art designs inasmuch as no space exists between adjacent cells. The cells 16 shown are manufactured from a number of L-shaped sections 34 of a height sufficient to extend higher than the height of a fuel assembly and of a length and width just slightly in excess of those dimensions of a fuel assembly. To impart strength and stability to the cells, the cell walls are made of 0.075 inch stainless steel although cell walls of different thicknesses may be used depending on the design criteria for the particular application. Neutron absorbing material 36, more fully described hereafter, is attached along the length and on the outside cell wall surfaces to help preclude the transfer of neutrons from one fuel assembly to another located in adjacent cells. All of the cells in the fuel rack module except those on the fuel rack periphery have neutron absorbing material on all four sides.

Each inner cell is made up of two L-shaped sections 34, and to provide simplicity in the manufacturing operations, neutron absorbing material is attached to the outer side of the walls of both L-shaped sections. To form a complete cell, one of the two thusly formed manufacturing sections 34 is placed in contact with, or in substantial contact with the corresponding longitudinal edges on the other sections. When these abutting edges of the two L-shaped sections are joined together by welds 42 (FIG. 5) a complete cell is formed of a size sufficient to accept a fuel assembly. The cell is enclosed by neutron absorbing material 36 on all four walls (FIG. 1) and it is evident that the material on these walls serves the same function in absorbing neutrons from fuel assemblies in the adjacent cells. When the cells of a complete module are constructed in this manner, examination of FIG. 4 will show that every alternate cell is formed by the L-shaped sections which surround it. Note for example that the cell designated 44 is formed by walls 46, 48, 50, and 52. Each of these walls also comprise one wall of each cell which surround the cell 44. Cells which are thusly formed by the L-shaped walls are designated C and those cells which share the walls of the C cell are designed O.

The neutron absorbing material 36 preferably comprises Boraflex which is an elastomeric silicone polymer matrix manufactured by Brand Industrial Services, Inc. of Parkridge, Ill. Other neutron absorbing materials may be used if desired. The Boraflex is approximately 0.045 inch thick and extends substantially the full length and width of the side wall on which it is mounted. A wrapper plate 54 of 0.035 inch stainless steel protects the Boraflex against physical damage and is welded along the edges to the L section wall surfaces. The wrapper plate 54 may terminate short of the end of each L-shaped section as shown in FIG. 10, or extend to the complete end. An inspection hole 55, FIG. 10, is used to visually verify proper placement of the neutron absorber material. Also, it will be noted that each alternate cell on the module periphery is closed by a panel 58, FIG. 4, which extends the cell complete length.

To form a spent fuel rack, all the L-shaped sections are assembled into cells as described above, and with this construction, the interior of each cell, other than those cells located on the module periphery, is bounded by walls having neutron absorbing material located either on the inside or the outside walls of a particular cell. Since the corner cells of the module do not require neutron absorbing material on its outside walls, the L-shaped sections 56 located at the corners comprise only stainless steel plate having their longitudinal edges welded to adjacent L-shaped sections on the module. When thus welded, each corner cell is then of a size and configuration to accept a fuel assembly.

FIGS. 4-6 illustrate how the L-shaped sections are welded together to form cells. Variations in the characteristics of the stainless steel material after being exposed to varying temperatures and stresses during the manufacturing process, produces slight distortion in the material such that the L section longitudinal edges do not always fall in a vertical plane. Usually the longitudinal edges can be welded along their complete length as shown in FIGS. 5 and 6 wherein weld 42 metallurgically joins adjacent L-shaped sections 34. In the event the adjacent L sections to be welded are spaced a distance greater than that which can be bridged by a single weld, such as weld 63, 0.18 inch spacer wire 68 shown in FIG. 5, is welded in the gap formed at the intersection of the L sections. Separate welds 63 are then made between each section and the wire spacer and along their complete height to provide stability to the fuel rack module. Since the space between adjacent sections may vary, it is evident that spacer wire, or other appropriate filler material, or different diameters or strips of different thicknesses and lengths may be welded to the adjacent L sections to hold the parts together.

The base plate 14 illustrated in FIGS. 3, 7 and 10 includes openings 30 which receive the bottom nozzle 64 of a fuel assembly adapted to be placed in the opening 30 provided in each cell 16. As shown in FIG. 10, the plate opening 30 is of a size larger than the bottom nozzle 64 but smaller than an upper portion 66 thereof. The wall of opening 30 includes a bevel 69 complementary to the sides of the nozzle 64 which provides a surface area which supports a fuel assembly when positioned on the rack.

Figure 8:
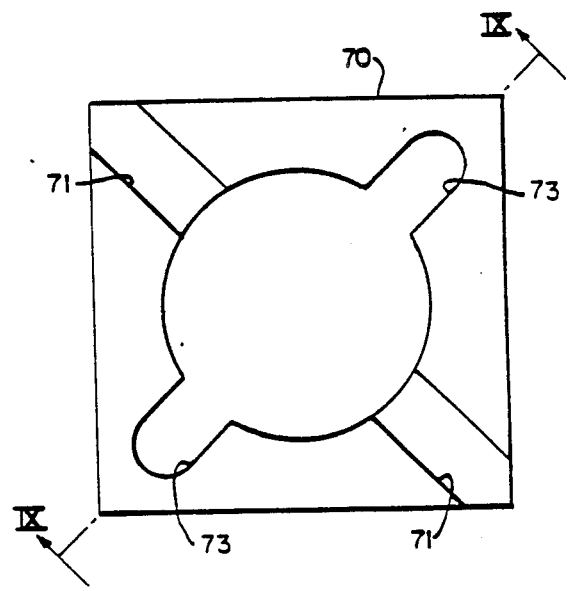
FIG. 8 is a bottom view of a support plate arranged to be welded to the underside of the base plate which supports the module and includes an opening of desired configuration for lifting the base plate and moving it from one location to another.
Figure 9:
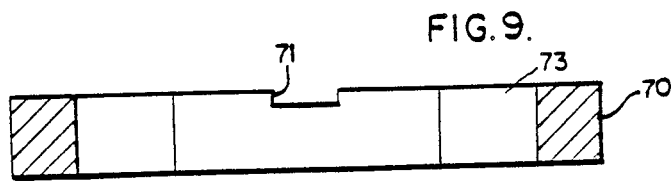
FIG. 9 is a view taken on lines IX—IX of FIG. 8.

The openings 30 are further modified, FIGS. 3, 8 and 10, to permit access to lifting apparatus for transferring the base plate 14 alone, or the base plate plus the stainless steel cells, from one location to another. To accomplish this each of four openings 30 are provided with oppositely directed slots 32 of a size sufficient to accept lifting apparatus (not shown). The apparatus is of a length just sufficient to fit through slot 32 prior to being rotated 90° to a position for engagement with the underside of plate 14 for lifting purposes. To impart strength to the base plate 14 in the areas where the lifting apparatus will engage the plate, a one-inch stainless steel block 70, FIGS. 8 and 9, having a lifting tool opening 73 of the same design as slot 32 in the base plate 14, is welded to the underside of the base plate and at the four positions indicated in FIG. 3. Depending on the size of base plate and module being lifted, either a greater or lesser number of openings may be provided for lifting purposes. The stainless steel block 70 includes in the underside a tool retaining slot 71. The slot is located in the manner shown to provide an impediment to rotation of the lifting apparatus after it is inserted through the slots 32 and rotated 90° to a plate lifting position. When the base plate is lifted, the retaining slot will prevent rotation of the lifting apparatus in the event it is jarred or vibrated during transfer of the base plate from one position to another.

The leveling apparatus beneath plate 14 is similar to the design set forth in U.S. Pat. No. 4,820,472 inasmuch as the leveling pads are designed to conform to the slope of the pool floor and still achieve true squareness in the construction relative to vertical and horizontal axes. As illustrated in FIGS. 7 and 10, each corner leveling pad 26 is mounted on the pool floor 100 (FIGS. 1 and 2) for leveling base plate 14. Pedestal 72 is mounted for free unrestricted movement on the pool floor. The pedestal includes an articulated surface 74 which merges into upstanding cylindrical walls 76. A leveling screw 78 having a spherical surface 80 formed on its bottom engages, end is complementary to, pedestal surface 74. After the end of leveling screw 78 is placed in the pedestal, a retaining plate 82 is welded to the pedestal 72 thus leaving a space 84 into which the end of the screw may move if necessary for leveling purposes. External threads 86 on the screw mesh with similar threads 88 on a support pad 90 so that when the screw is rotated by a tool in slot 92 (FIG. 7), the support pad 90 is caused to be moved vertically. The support pad 90 is welded to the inner surface of four plates 94 (FIG. 10) attached to the bottom of base plate 14. The radially spaced support arms 95 are attached to the underside of base plate 14 by welds 96.

In operation, to adjust base plate 14 to a level condition, leveling pads 26 are located beneath the base plate corners and at selected positions under the base plate central area. To level the base plate and cells thereon, each leveling screw 78 is moved in an amount and direction to have bottom surface of pedestal 72 tilt or conform to the slope and elevation of the floor on which pool liner 70 rests. If the liner floor is uneven, the complementary spherical surfaces on the pedestal and leveling screw are adjusted to each other until the axis of leveling screw 78 lies in a vertical plane. By inserting a tool in slot 92 and rotating the leveling screw, which then acts as a bearing, the support pad 90 will act through plates 94 to vertically move the base plate and thus raise or lower it to a desired position. This action is repeated for each corner and central area support pad until the base plate 14 is adjusted to the desired position.

It will be apparent that many modifications and variations are possible in light of the above teachings. It therefore is to be understood that within the scope of the appended claims, the invention may be practiced other than as specifically described.

We claim:
1. For the use in storing a plurality of nuclear fuel assemblies in a storage pool containing a coolant and having a pool floor, a fuel rack module comprising:
 (a) a base plate to be disposed generally horizontally on said floor and having a horizontal surface area sufficient to support a plurality of fuel assemblies;
 (b) a plurality of uniformly spaced openings in said base plate, disposed in rows and columns throughout said surface area;
 (c) a plurality of fabricated cells of rectangular cross section extending over alternate openings along each row of said openings, the fabricated cells of each row being uniformly staggered by one opening with respect to the cells of its just adjacent rows so that said fabricated cells form a checkerboard like array;
 (d) each of said fabricated cells having elongated walls mounted generally vertically on said base plate;
 (e) each of the corners formed by the walls of each fabricated cell, which corners are internal of the periphery of said array, being disposed as closely adjacent as practicable to and face-to-face with a corner of an adjacent fabricated cell and joined by weld means so that substantially no space exists between adjacent cells, said cells being welded to their bottom ends to said base plate so that a strong compact modular structure is produced;
 (f) the said walls of each of said fabricated cell enclosing its associated opening of said each of said fabricated cells so that said coolant can flow through said associated opening and through the fabricated cell with which it is associated;
 (g) the walls of each four fabricated cells internally of the periphery of said array defining a four-sided additional cell and the opposite walls of consecutively arrayed fabricated cells along the periphery of said module defining two of the walls of additional cells, between corner cells, along the periphery of said array, third walls of each said additional cells along the periphery between the corner cells being defined by the outer walls of the row of fabricated cells directly inwardly of said consecutively arrayed cells and a fourth wall of each cell along the periphery between said corner cells extending as a section of the outer wall along the periphery of said array, and the corner cells being fabricated and each having a wall extending inwardly from the outer wall of said array in common with the adjacent additional cell along the periphery of said array, the other walls of each corner cell constituting sections of the outer wall of said array, said peripheral sections of the walls of the cells along said array being coextensive and constituting together the outer wall of the array;
 (h) neutron-absorbing means on the external surface of the fabricated cell walls except on the coextensive sections of the outer wall around the periphery of said array; and
 (i) leveling pads are mounted under the base plate near the periphery thereof and adjustably engage the pool floor and intermediate leveling pads are mounted under cells within said fuel-rack module, said intermediate pads being uniformly disposed.
2. The module of claim 1 wherein the neutron-absorbing material is disposed in a pocket formed between each external surface of each wall defining the fabri- cated cells and a plate secured to said external surface and extending along the major length of said external surface.

3. The fuel-rack module of claim 1 wherein each fuel assembly has a bottom nozzle and each of the uniformly spaced openings is shaped and dimensioned to receive said bottom nozzle and support each said assembly by engaging the upper portion of said bottom nozzle.

* * * * *